(12) United States Patent
Dalal

(10) Patent No.: US 9,032,414 B1
(45) Date of Patent: May 12, 2015

(54) SYSTEMS AND METHODS FOR MANAGING SYSTEM RESOURCES ALLOCATED FOR BACKUP VALIDATION

(75) Inventor: Chirag Dalal, Pune (IN)

(73) Assignee: Symantec Corporation, Mountain View, CA (US)

( * ) Notice: Subject to any disclaimer, the term of this patent is extended or adjusted under 35 U.S.C. 154(b) by 715 days.

(21) Appl. No.: 13/314,744

(22) Filed: Dec. 8, 2011

(51) Int. Cl.
 G06F 13/00 (2006.01)
 G06F 9/46 (2006.01)
 G06F 9/50 (2006.01)
 G06F 11/14 (2006.01)

(52) U.S. Cl.
 CPC .............. *G06F 9/50* (2013.01); *G06F 11/1469* (2013.01); *G06F 11/1458* (2013.01)

(58) Field of Classification Search
 None
 See application file for complete search history.

(56) References Cited

U.S. PATENT DOCUMENTS

| | | | |
|---|---|---|---|
| 7,370,233 B1* | 5/2008 | Sobel et al. | 714/15 |
| 7,669,020 B1* | 2/2010 | Shah et al. | 711/162 |
| 2006/0195715 A1* | 8/2006 | Herington | 714/4 |
| 2010/0306382 A1* | 12/2010 | Cardosa et al. | 709/226 |
| 2011/0087874 A1* | 4/2011 | Timashev et al. | 713/100 |
| 2011/0202734 A1* | 8/2011 | Dhakras et al. | 711/162 |
| 2011/0219118 A1* | 9/2011 | Cowan et al. | 709/224 |

\* cited by examiner

*Primary Examiner* — Abdullah Al Kawsar
(74) *Attorney, Agent, or Firm* — ALG Intellectual Property, LLC

(57) ABSTRACT

A computer-implemented method for managing system resources allocated for backup validation may include (1) identifying a computing system that is to be backed up, (2) monitoring at least one resource of the computing system in order to determine to what extent the resource is utilized, (3) identifying a minimum utilization level of the resource, (4) determining an amount of the resource required to validate a backup of the computing system, (5) configuring a validation system to validate the backup of the computing system, wherein resources of the validation system are allocated based at least in part on the amount of the resource required to validate the backup of the computing system, and (6) using the validation system to validate the backup of the computing system in order to reduce backup-validation resource consumption. Various additional methods, systems, and encoded computer-readable media are also disclosed.

20 Claims, 6 Drawing Sheets

400 

| Computing System Configuration 410 ||
|---|---|
| Processors | 4 Cores |
| Processor Speed | 3000 MHz |
| Memory | 64 GB |
| Disk I/O | 200 MB/sec |
| Network Speed | 700 Mbits/sec |

| Minimum Utilization Levels 420 ||
|---|---|
| Core 1 | 24% |
| Core 2 | 23% |
| Core 3 | 17% |
| Core 4 | 19% |
| Memory | 45% |
| Disk I/O | 80 MB/sec |
| Network | 300 Mbits/sec |

| Resource Requirements 430 ||
|---|---|
| Processing | 2590 MHz |
| Memory | 29 GB |
| Disk I/O | 80 MB/sec |
| Network Speed | 305 Mbits/sec |

| Validation System Configuration 440 ||
|---|---|
| Processors | 2 virtual CPUs |
| Processor Speed | 1800 MHz |
| Memory | 32 GB |
| Disk I/O | 80 MB/sec |
| Network Speed | 305 Mbits/sec |

*FIG. 4*

SYSTEMS AND METHODS FOR MANAGING SYSTEM RESOURCES ALLOCATED FOR BACKUP VALIDATION

BACKGROUND

Upon creating a backup of a computing system, traditional backup systems may perform a validation procedure on the backup to determine whether the backup was created successfully and whether the backup can be used to restore the computing system in case of a system failure.

Some backup systems may use a virtual machine to validate the backup of the computing system. For example, a backup system may first create a backup of the computing system. Next, the backup system may configure a virtual machine that is similar to the computing system. Finally, the backup system may validate the backup by attaching the backup to the virtual machine and by attempting to boot the virtual machine. In this example, the backup system may determine that the backup of the computing system is restorable if the virtual machine is able to boot successfully.

To ensure that the virtual machine has sufficient system resources to boot with the backup attached, a backup system may configure the virtual machine with system resources in an amount that is equal to system resources allocated to the computing system. Allocating validation system resources in this manner may be inefficient because loads encountered by the virtual machine during backup validation may be lower than loads encountered by the computing system. For this reason, some system resources allocated to the virtual machine may never be used. This inefficiency may be amplified when many backups must be validated concurrently.

On the other hand, if a backup system attempts to configure a virtual machine with fewer system resources, validation of the backup of the computing system may fail because the virtual machine may not have sufficient system resources to boot with the backup of the computing system attached. In this example, backup validation may fail even though the backup of the computing system may be restorable. Accordingly, the instant disclosure addresses a need for systems and methods for managing system resources allocated for backup validation in a more efficient manner.

SUMMARY

As will be described in greater detail below, the instant disclosure generally relates to systems and methods for managing system resources allocated for backup validation based on how resources of a backed up computing system are utilized while one or more applications run within the computing system.

In one example, a computer-implemented method for managing system resources allocated for backup validation may include (1) identifying a computing system that is to be backed up, wherein at least one application runs within the computing system, (2) monitoring at least one resource of the computing system in order to determine to what extent the resource is utilized while the application runs within the computing system, (3) based on the monitoring of the resource of the computing system, identifying a minimum utilization level of the resource, (4) determining, based at least in part on the minimum utilization level of the resource, an amount of the resource required to validate a backup of the computing system, wherein validating the backup of the computing system includes running the application, (5) configuring a validation system to validate the backup of the computing system, wherein resources of the validation system are allocated based at least in part on the amount of the resource required to validate the backup of the computing system, and (6) upon configuring the validation system, using the validation system to validate the backup of the computing system in order to reduce backup-validation resource consumption.

In some embodiments, the method may further include storing, with the backup of the computing system, the minimum utilization level of the resource and/or the amount of the resource required to validate the backup of the computing system.

In other embodiments, the step of identifying the minimum utilization level of the resource may include identifying a lowest utilization level of the resource detected during a predetermined period of time. In one embodiment, the minimum utilization level of the resource may include the lowest utilization level of the resource detected during the predetermined period of time. In certain embodiments, the predetermined period of time may occur before the backup of the computing system is created.

In at least one embodiment, the step of using the validation system to validate the backup of the computing system may include (1) running the application within the validation system in order to determine whether the backup of the computing system is restorable and/or (2) running at least one validation script within the validation system. In some embodiments, the validation script may be used to validate the backup of the computing system.

In various embodiments, the amount of the resource required to validate the backup of the computing system may include the minimum utilization level of the resource and/or a predetermined additional amount of the resource. In one embodiment, the predetermined additional amount of the resource may represent an amount of the resource required to run the validation script within the validation system.

In some embodiments, the computing system may include a virtual machine, and the step of monitoring the resource of the computing system may be performed, at least in part, using a hypervisor application programming interface (API). In one embodiment, the hypervisor API may provide access to resource utilization information of the virtual machine.

In other embodiments, the step of monitoring the resource of the computing system may be performed, at least in part, by a monitoring agent application running within the computing system.

In some embodiments, the validation system may include at least one virtual machine. In another embodiment, the resource of the computing system may include a processing resource, a memory resource, a storage resource, and/or a network resource.

In one embodiment, a system for implementing the above-described method may include (1) an identification module programmed to identify a computing system that is to be backed up, wherein at least one application runs within the computing system, (2) a resource-monitoring module programmed to monitor at least one resource of the computing system in order to determine to what extent the resource is utilized while the application runs within the computing system, (3) a utilization-level identification module programmed to, based on the monitoring of the resource of the computing system, identify a minimum utilization level of the resource, (4) a required-resource determination module programmed to determine, based at least in part on the minimum utilization level of the resource, an amount of the resource required to validate a backup of the computing system, wherein validating the backup of the computing system includes running the application, (5) a configuration module programmed to configure a validation system to validate the backup of the computing system, wherein resources of the validation system are allocated based at least in part on the amount of the resource required to validate the backup of the computing system, (6) a validation module programmed to, upon configuring the validation system, use the validation system to validate the backup of the computing system in order to reduce backup-validation resource consumption, and (7) at least one processor configured to execute the identification module, the resource-monitoring module, the utilization-level identification module, the required-resource determination module, the configuration module, and the validation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a computing system that is to be backed up, wherein at least one application runs within the computing system, (2) monitor at least one resource of the computing system in order to determine to what extent the resource is utilized while the application runs within the computing system, (3) based on the monitoring of the resource of the computing system, identify a minimum utilization level of the resource, (4) determine, based at least in part on the minimum utilization level of the resource, an amount of the resource required to validate a backup of the computing system, wherein validating the backup of the computing system includes running the application, (5) configure a validation system to validate the backup of the computing system, wherein resources of the validation system are allocated based at least in part on the amount of the resource required to validate the backup of the computing system, and (6) upon configuring the validation system, use the validation system to validate the backup of the computing system in order to reduce backup-validation resource consumption.

As will be explained in greater detail below, by managing system resources allocated for backup validation based on system resource utilization levels, the systems and methods disclosed herein may reduce backup-validation resource consumption, require fewer resources to be set aside for validation purposes, and allow more backup validations to be performed using available resources by allocating resources used for backup validation more efficiently.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of exemplary system-resource information.

Figure 1:
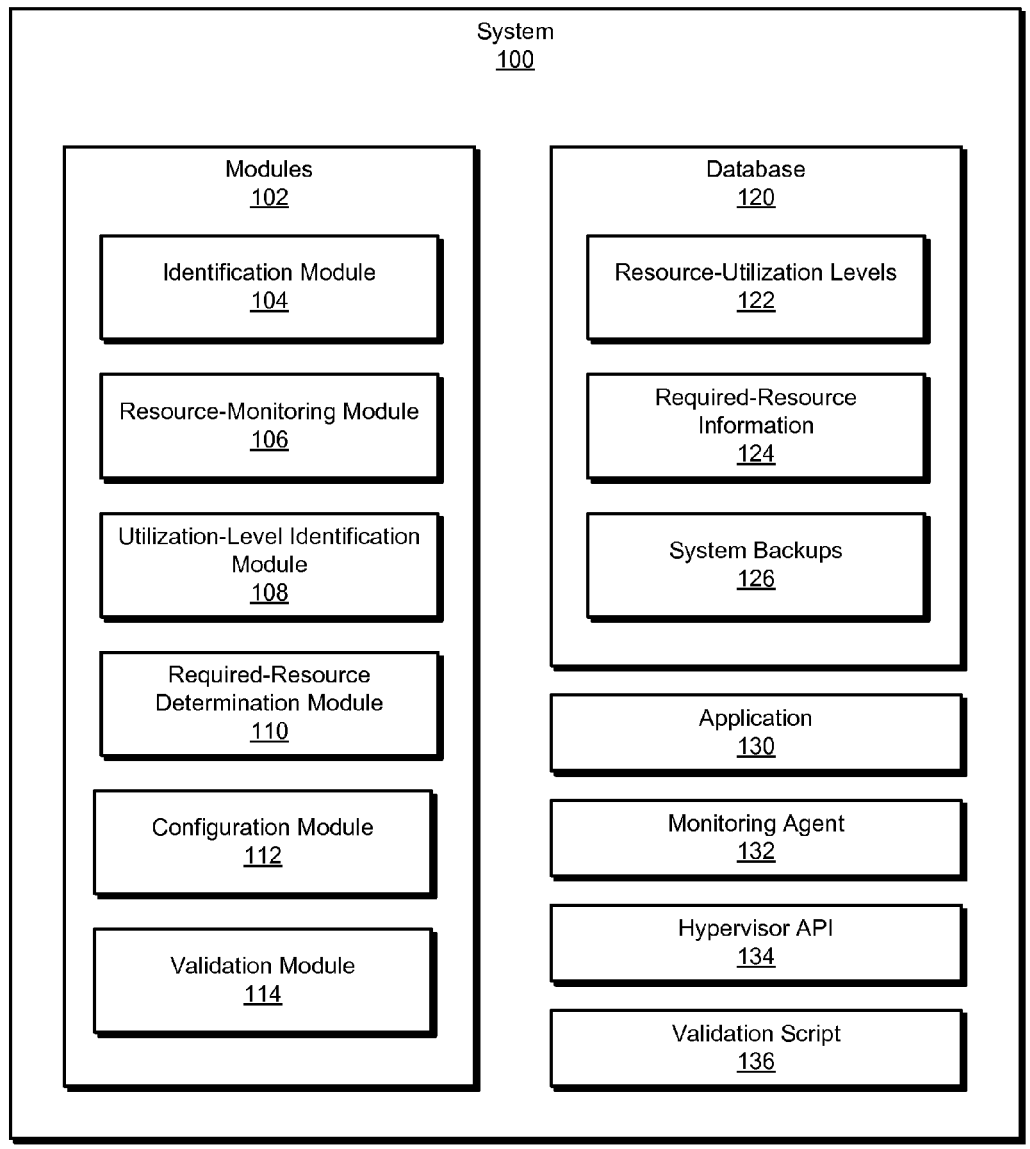
FIG. 1 is a block diagram of an exemplary system for managing system resources allocated for backup validation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
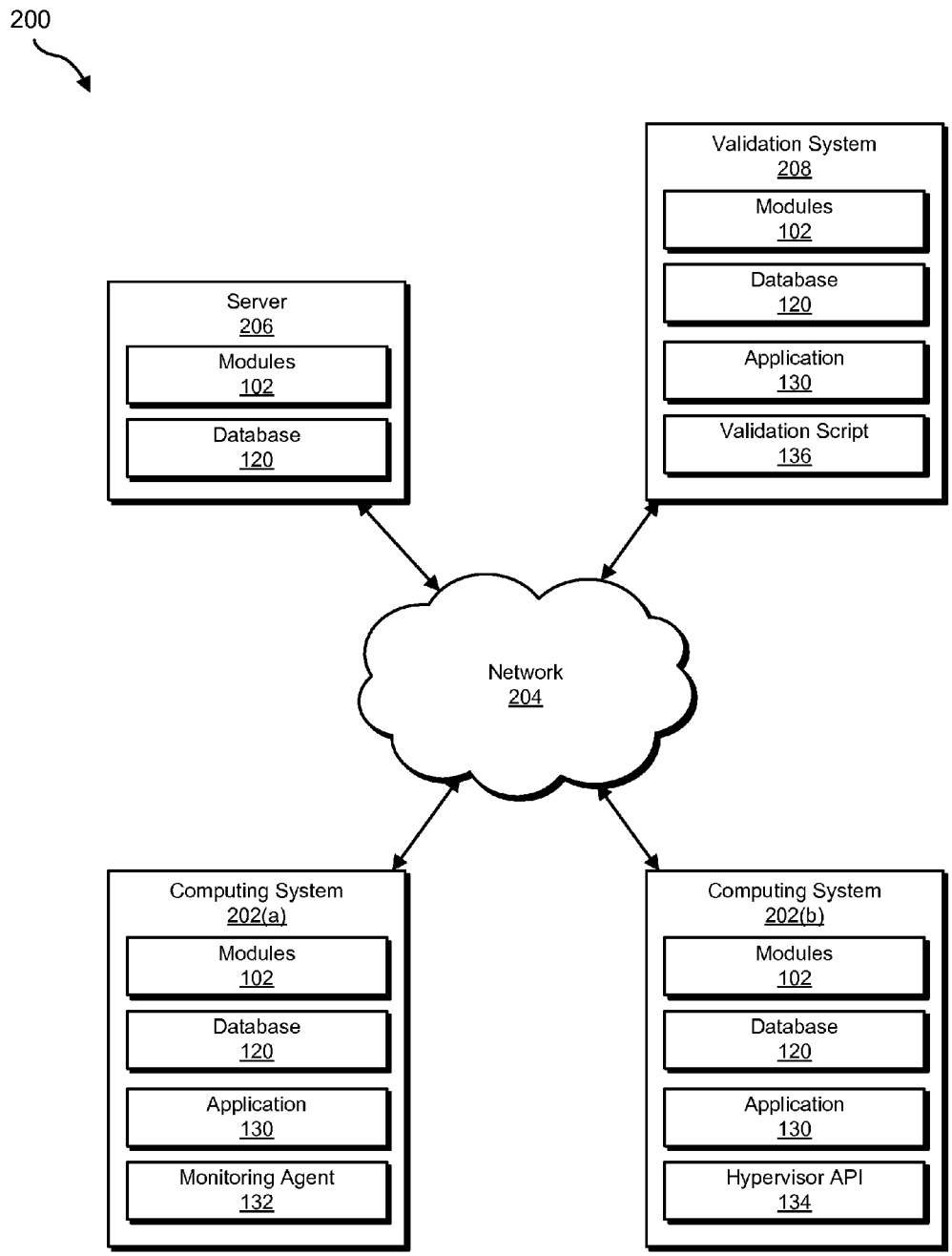
FIG. 2 is a block diagram of an exemplary system for managing system resources allocated for backup validation.

The following will provide, with reference to FIGS. 1-2, detailed descriptions of exemplary systems for managing system resources allocated for backup validation. Detailed descriptions of corresponding computer-implemented methods will also be provided in connection with FIG. 3. In addition, detailed descriptions of exemplary system-resource information will be provided in connection with FIG. 4. Detailed descriptions of an exemplary computing system and network architecture capable of implementing one or more of the embodiments described herein will also be provided in connection with FIGS. 5 and 6, respectively.

FIG. 1 is a block diagram of an exemplary system 100 for managing system resources allocated for backup validation. As illustrated in this figure, exemplary system 100 may include one or more modules 102 for performing one or more tasks. For example, and as will be explained in greater detail below, exemplary system 100 may include an identification module 104 programmed to identify a computing system that is to be backed up, wherein at least one application runs within the computing system. Exemplary system 100 may also include a resource-monitoring module 106 programmed to monitor at least one resource of the computing system in order to determine to what extent the resource is utilized while the application runs within the computing system. Exemplary system 100 may further include a utilization-level identification module 108 programmed to identify a minimum utilization level of the resource based on the monitoring of the resource of the computing system.

In addition, and as will be described in greater detail below, exemplary system 100 may include a required-resource determination module 110 programmed to determine, based at least in part on the minimum utilization level of the resource, an amount of the resource required to validate a backup of the computing system, wherein validating the backup of the computing system includes running the application. Exemplary system 100 may also include a configuration module 112 programmed to configure a validation system to validate the backup of the computing system and/or allocate resources of the validation system based at least in part on the amount of the resource required to validate the backup of the computing system. Exemplary system 100 may further include a validation module 114 programmed to use the validation system to validate the backup of the computing system in order to reduce backup-validation resource consumption. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing systems 202(a) and 202(b), server 206, and/or validation system 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. For example, and as will be explained in greater detail below, database 120 may include resource-utilization levels 122 for storing resource-utilization level information (such as minimum utilization levels 420 in FIG. 4). In addition, database 120 may include required-resource information 124 for storing required-resource information (such as resource requirements 430 in FIG. 4). Database 120 may also include system backups 126 for storing computing-system backups, resource-utilization level information, and/or required-resource information.

Database 120 may represent portions of a single database or computing device or a plurality of databases or computing devices. For example, database 120 may represent a portion of computing system 202(a), computing system 202(b), server 206, and/or validation system 208 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing system 202(a), computing system 202(b), server 206, and/or validation system 208 in FIG. 2, computing system 510 in FIG. 5, and/or portions of exemplary network architecture 600 in FIG. 6.

As illustrated in FIG. 1, exemplary system 100 may further include an application 130, a monitoring agent 132, a hypervisor API 134, and a validation script 136. Application 130 may represent any application or process capable of running within a computing system. In some embodiments, application 130 may represent an essential application running within the computing system. In one embodiment, a backup of the computing system may be invalid or unrestorable if this essential application is unable to run correctly during backup validation.

Monitoring agent 132 may represent an application or process capable of monitoring at least one resource of a computing system while running within the computing system. Similarly, hypervisor API 134 may represent any hypervisor API capable of monitoring at least one resource of a virtual machine. Finally, validation script 136 may represent a script that is capable of validating a backup of a computing system while running within a validation system.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing system 202(a), a computing system 202(b), and a validation system 208 in communication with a server 206 via a network 204. In one example, server 206 may perform one or more backup and/or backup-validation functions. For example, server 206 may (1) create a backup of computing system 202(a) and/or computing system 202(b), (2) determine the resources required to validate the backup, (3) configure validation system 208 to validate the backup based on the required resources, and (4) use validation system 208 to validate the backup.

In one embodiment, one or more of modules 102 from FIG. 1 may, when executed by at least one processor of a computing device (e.g., computing system 202(a), computing system 202(b), server 206, or validation system 208), enable the computing device to manage system resources allocated for backup validation. For example, and as will be described in greater detail below, one or more of modules 102 may cause computing system 202(a) (either alone or in combination with server 206) to (1) identify computing system 202(a) as a computing system that is to be backed up, wherein at least one application (e.g., application 130) runs within computing system 202(a), (2) monitor at least one resource of computing system 202(a) in order to determine to what extent the resource is utilized while application 130 runs within computing system 202(a), (3) based on the monitoring of the resource of computing system 202(a), identify a minimum utilization level of the resource, (4) determine, based at least in part on the minimum utilization level of the resource, an amount of the resource required to validate a backup of computing system 202(a), wherein validating the backup of computing system 202(a) includes running application 130, (5) configure validation system 208 to validate the backup of computing system 202(a), wherein resources of validation system 208 are allocated based at least in part on the amount of the resource required to validate the backup of computing system 202(a), and (6) upon configuring validation system 208, use validation system 208 to validate the backup of computing system 202(a) in order to reduce backup-validation resource consumption.

Computing systems 202(a) and 202(b) generally represent any type or form of computing system or device capable of reading computer-executable instructions. Examples of computing systems 202(a) and 202(b) include, without limitation, laptops, desktops, servers, physical and/or virtual machines, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of reading computer-executable instructions and performing one or more of the steps described herein. Examples of server 206 include, without limitation, application servers and database servers configured to provide various database services and/or run certain software applications.

Validation system 208 generally represents any type or form of computing system capable of reading computer-executable instructions and performing one or more of the validation steps described herein. In at least one embodiment, at least a portion of validation system 208 may be virtualized. For example, validation system 208 may include at least one virtual machine. As used herein, the term "virtual machine" may refer to any virtualization (including hardware-assisted virtualization), implementation, or emulation of a physical computing device managed by a hypervisor. Examples of managing hypervisors may include, without limitation, VMWARE ESX/ESXI, MICROSOFT HYPER-V, VMWARE PLAYER, MICROSOFT VIRTUALPC, SUN VIRTUALBOX, CITRIX XENSERVER, and PARALLELS.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202(a), computing system 202(b), server 206, and/or validation system 208.

Figure 3:
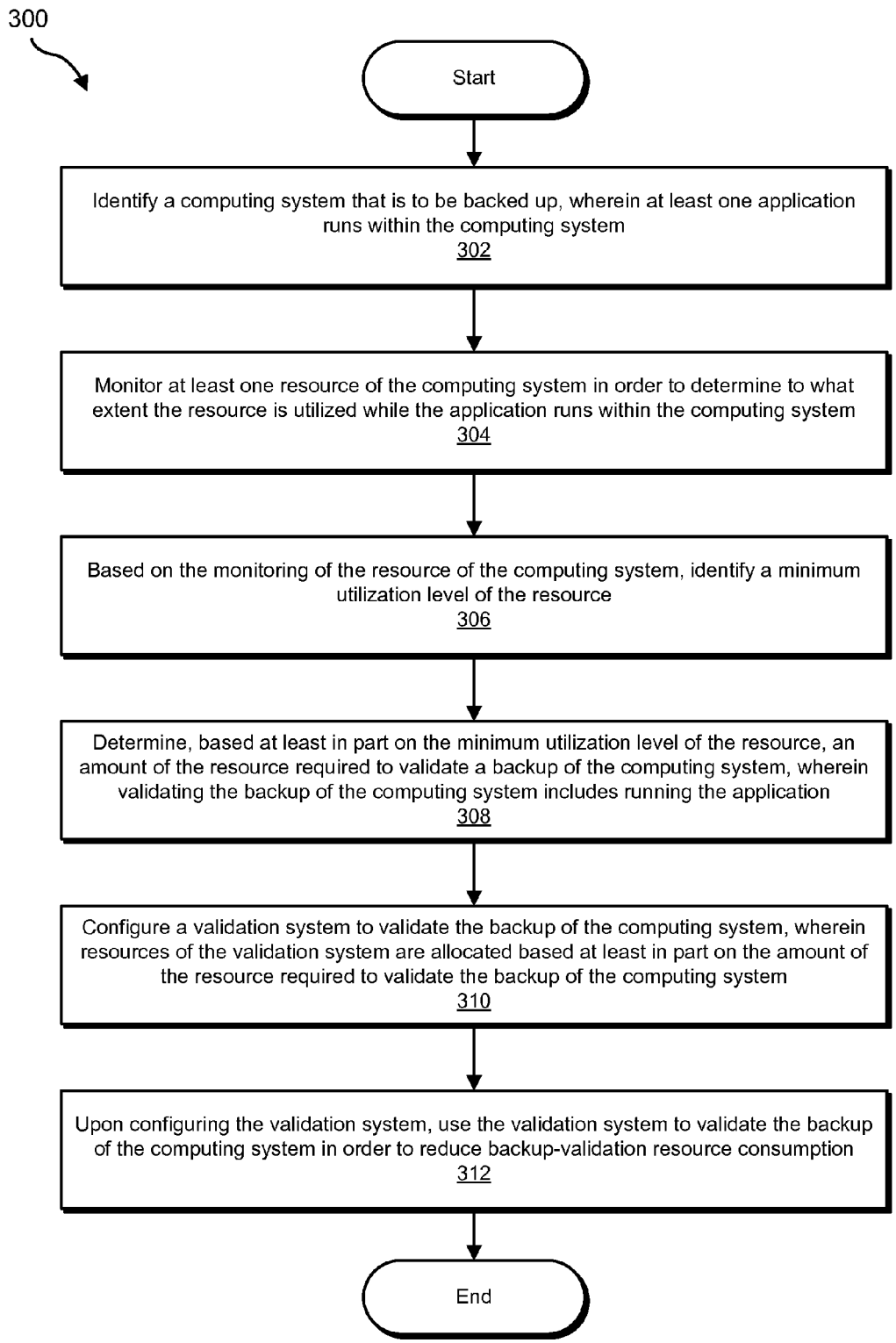
FIG. 3 is a flow diagram of an exemplary method for managing system resources allocated for backup validation.

FIG. 3 is a flow diagram of an exemplary computer-implemented method 300 for managing system resources allocated for backup validation. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

At step 302, one or more of the systems described herein may identify a computing system that is to be backed up, wherein at least one application runs within the computing system. For example, identification module 104 may identify computing system 202(a) and/or computing system 202(b) as computing systems that are to be backed up.

As used herein, the term "computing system" may generally refer to one or more physical and/or virtual computing devices that host one or more applications. Examples of computing systems may include, without limitation, database servers, email servers, web servers, and/or application servers.

A computing system may include one or more resources. As used herein, the term "resource" may refer to any physical or virtual component of a computing system that is required to run an application within the computing system. Examples of resources may include, without limitation, processor resources (e.g., a central processing unit), memory resources (e.g., random access memory), storage resources (e.g., a hard-disk storage device), and/or network resources (e.g., a network interface card).

In some examples, the amount of resources allocated to a computing system may be based on (1) the applications running within the computing system and (2) the load the computing system is expected to encounter. For example, a computing system hosting a database server may require certain minimum resource requirements to handle a specific number of queries per second or a specific number of transactions per second. In another example, a computing system hosting an email server may require different minimum resource requirements to handle a specific number of incoming emails or a specific number of user connections. As will be described in greater detail below, the amount of resources required by a computing system may be different than the amount of resources required by a validation system configured to validate a backup of the computing system. An example of an exemplary computing system configuration will be provided below in connection with FIG. 4.

Identification module 104 may identify a computing system that is to be backed up in a variety of ways. In one example, identification module 104 may be part of a backup system and may identify one or more computing systems that have been or will be backed up by the backup system. In another example, identification module 104 may identify the computing system by receiving a request to validate a backup of the computing system.

At step 304, one or more of the systems described herein may monitor at least one resource of the computing system in order to determine to what extent the resource is utilized while the application runs within the computing system. For example, resource-monitoring module 106 may monitor at least one resource of computing system 202(a) in order to determine to what extent the resource is utilized while application 130 runs within computing system 202(a).

Resource-monitoring module 106 may monitor a resource of a computing system in a variety of ways. In one embodiment, resource-monitoring module 106 may monitor the resource of the computing system using a monitoring agent application running within the computing system. For example, resource-monitoring module 106 may monitor a resource of computing system 202(a) using monitoring agent 132.

In another embodiment, for example when the computing system includes a virtual machine, resource-monitoring module 106 may monitor a resource of the virtual machine using a hypervisor API that provides access to resource utilization information of the virtual machine. For example, resource-monitoring module 106 may monitor a resource of computing system 202(b) using hypervisor API 134.

In some embodiments, resource-monitoring module 106 may monitor the resource of the computing system by identifying a utilization level of the resource and/or by determining any other information about the resource (e.g., a capacity, a size, a type, a model, etc.). As used herein, the term "utilization level" may refer to a value (e.g., a quantity or percentage) that expresses how much of a resource has been or is currently being utilized. In one example, a utilization level may indicate how much of a resource has been utilized during a predetermined period of time. For example, a utilization level of a network interface card may be 80 Mbits/sec. In another example, a utilization level may indicate how much of a resource is utilized at a specific instance of time. For example, a utilization level of a memory resource may indicate that 20 GB is currently being utilized, while a utilization level of a CPU may indicate that 40% of the processing cycles of the CPU are currently being utilized.

As will be explained in greater detail below, the process of validating a backup of a computing system may include running an application within a validation system whose resources have been allocated based on how resources of the computing system have been utilized while the application runs within the computing system. For this reason, how resources of the computing system are utilized while the application is not running within the computing system may be irrelevant. Therefore, in at least one embodiment, resource-monitoring module 106 may (1) detect whether the application is currently running within the computing system and (2) monitor the resource of the computing system only when the application is running within the computing system. In one example, an application may be considered to be running within the computing system if at least a portion of the application is being executed by a processor resource of the computing system.

In some embodiments, resource-monitoring module 106 may detect that the application is currently running within the computing system by using a monitoring agent application and/or a hypervisor API. For example, resource-monitoring module 106 may detect that application 130 is currently running within computing system 202(a) using monitoring agent 132. In another example, resource-monitoring module 106 may detect that application 130 is currently running within computing system 202(b) using hypervisor API 134.

In at least one embodiment, resource-monitoring module 106 may store resource-utilization information, which was obtained while monitoring the resource, to be used later in determining a minimum utilization level for the resource. For example, resource-monitoring module 106 may store a utilization level for the resource in resource-utilization levels 122.

At step 306, one or more of the systems described herein may, based on the monitoring of the resource of the computing system, identify a minimum utilization level of the resource. For example, utilization-level identification module 108 may identify a minimum utilization level of the resource based on information obtained while monitoring the resource in step 304.

As used herein, the term "minimum utilization level" may refer to the lowest amount of a resource of a computing system utilized by one or more applications running within the computing system. An example of exemplary minimum utilization levels will be provided below in connection with FIG. 4.

In some embodiments, a minimum utilization level may represent the lowest utilization level of a resource detected during a predetermined period of time. In one embodiment, the predetermined period of time may occur before a backup of the computing system has been created. For example, a minimum utilization level of a resource may represent the lowest utilization level of the resource that has been detected during the hour, the day, or the week prior to the creation of the backup of the computing system. In other examples, a minimum utilization level of a resource may represent the lowest utilization level of the resource that has been detected since the last backup of the computing system was created, since the first utilization level of the resource was monitored, and/or any other suitable period of time.

In other embodiments, the predetermined period of time may occur after the backup of the computing system has been created. For example, a minimum utilization level of the resource may represent the lowest utilization level of the resource detected during the hour, the day, the week, and/or any other suitable period of time after the creation of the backup of the computing system. In at least one embodiment, the predetermined period of time may occur when the backup of the computing system is created.

In some embodiments, a minimum utilization level may represent the lowest utilization level of a resource detected while the load encountered by an application running within a computing system is at a lowest level. For example, in the case of a computing system hosting a database server, a minimum utilization level may represent the lowest utilization level of a resource of the computing system detected while the database server handles a lowest number of queries per second or a lowest number of transactions per second.

Utilization-level identification module 108 may identify the minimum utilization level of the resource in a variety of ways. In one example, utilization-level identification module 108 may query resource-utilization levels 122 for the lowest utilization level of the resource that has been detected during a predetermined period of time. In another example, utilization-level identification module 108 may receive, from resource-monitoring module 106, utilization level information relating to the resource and may identify the minimum utilization level of the resource from this information.

In at least one embodiment, utilization-level identification module 108 may also store the identified minimum utilization level of the resource with the backup of the computing system. For example, after identifying the minimum utilization level of the resource, utilization-level identification module 108 may store the minimum utilization level of the resource in system backups 126. In another example, after identifying the minimum utilization level of the resource, utilization-level identification module 108 may store the minimum utilization level of the resource in resource-utilization levels 122.

At step 308, one or more of the systems described herein may determine, based at least in part on the minimum utilization level of the resource, an amount of the resource required to validate a backup of the computing system, wherein validating the backup of the computing system includes running the application. For example, required-resource determination module 110 may determine, based at least in part on the minimum utilization level of the resource (identified as part of step 306), an amount of the resource required to validate a backup of computing system 202(a), wherein validating the backup of computing system 202(a) includes running application 130.

As will be explained in greater detail below, the amount of the resource required to validate a backup of the computing system may represent an amount of the resource that would be required by a validation system to validate the backup of the computing system. For example, the amount of the resource required to validate the backup of the computing system may include the amount of the resource that would be required to boot the backup of the computing system, run the application within the validation system, and/or run one or more validation scripts within the validation system. An example of exemplary resource requirements will be provided below in connection with FIG. 4.

Required-resource determination module 110 may determine the amount of the resource required to validate the backup of the computing system in a variety of ways. For example, required-resource determination module 110 may determine the amount of the resource required to validate the backup of the computing system by querying required-resource information 124 for all minimum utilization levels associated with the computing system and/or the backup of the computing system.

In one embodiment, the amount of the resource required to validate the backup of the computing system may include the minimum utilization level of the resource that was identified as part of step 306 and/or a predetermined additional amount of the resource that represents an amount of the resource required to run the validation script within the validation system.

In certain embodiments, required-resource determination module 110 may further store the amount of the resource required to validate the backup of the computing system with the backup of the computing system. For example, required-resource determination module 110 may store the amount of the resource required to validate the backup of the computing system in system backups 126. In another embodiment, required-resource determination module 110 may store the amount of the resource required to validate the backup of the computing system in required-resource information 124.

At step 310, one or more of the systems described herein may configure a validation system to validate the backup of the computing system, wherein resources of the validation system are allocated based at least in part on the amount of the resource required to validate the backup of the computing system. For example, configuration module 112 may configure validation system 208 to validate the backup of computing system 202(a), wherein resources of validation system 208 are allocated based at least in part on the amount of the resource required to validate the backup of computing system 202(a) that was identified as part of step 308.

As used herein, the term "validation system" may generally refer to any computing system, which is used to validate a backup of a computing system, whose resources may be configured based on the resources required to validate the backup of the computing system. In at least one embodiment, a validation system may be virtualized and may include at least one virtual machine. An example of an exemplary validation system configuration will be provided below in connection with FIG. 4.

Configuration module 112 may configure the validation system in a variety of ways. In one embodiment, configuration module 112 may determine an amount of the resource to allocate to the validation system based on the amount of the resource required to validate the backup of the computing system. In one example, configuration module 112 may allocate an amount of the resource to the validation system by (1) identifying the backup of the computing system, (2) querying required-resource information 124 for information indicating the amount of resources required to validate the backup of the computing system, (3) identifying the amount of each resource required to validate the backup the computing system, and (4) allocating at least enough of each resource to meet the required amount. In certain embodiments, configuration module 112 may allocate an amount of the resource just equal to the amount of the resource required to validate the backup of the computing system.

In certain embodiments, as part of configuring the validation system, configuration module 112 may also attach the backup of the computing system to the validation system. For example, configuration module 112 may (1) locate the backup of the computing system, (2) create a snapshot of the backup, and (3) attach the snapshot of the backup to the validation system.

In certain embodiments, configuration module 112 may allocate resources to the validation system just prior to the moment when the validation system is used to validate the backup of the computing system. In at least one embodiment, configuration module 112 may configure the validation system so that resources are allocated to the validation system only until the validation system is used to validate the backup of the computing system.

At step 312, one or more of the systems described herein may, upon configuring the validation system, use the validation system to validate the backup of the computing system in order to reduce backup-validation resource consumption. For example, validation module 114 may use validation system 208, which has been configured to validate a backup of computing system 202(a) (as part of step 310), to validate the backup of computing system 202(a). As used herein, the term "validate" may refer to the process of determining whether a backup of a computing system is restorable.

Validation module 114 may use the validation system to validate the backup of the computing system in a variety of ways. In some embodiments, validation module 114 may use the validation system to validate the backup of the computing system by attempting to start or boot the validation system with the backup of the computing system attached. In one example, validation module 114 may determine that the backup of the computing system is valid and restorable if the validation system starts and runs successfully.

In another embodiment, after starting the validation system with the backup of the computing system attached, validation module 114 may also perform one or more additional validation steps. For example, validation module 114 may attempt to run the application within the validation system in order to determine whether the backup of the computing system is restorable. In another example, validation module 114 may also run at least one validation script within the validation system, wherein the validation script is used to validate the backup of the computing system. For example, validation module 114 may run validation script 136 within validation system 208.

In one example, validation module 114 may (either alone or in combination with the validation script) determine whether an application is running within the validation system, whether the application is able to successfully perform one or more tasks, and/or validate the backup in any other way. For example, validation script 136 running within validation system 208 may determine that application 130 is running and that application 130 is able to perform one or more tasks.

In some embodiments, upon validation of the backup of the computing system, validation module 114 may perform one or more cleanup tasks. In one example, validation module 114 may deactivate the validation system and may reclaim the resources allocated to the validation system so that the resources may be allocated to another validation system.

FIG. 4 is a block diagram of exemplary system-resource information 400. As shown in FIG. 4, exemplary system-resource information 400 may include a computing system configuration 410, minimum utilization levels 420, resource requirements 430, and validation system configuration 440.

Computing system configuration 410 illustrates how resources of a computing system may be allocated. For example, a computing system configured according to computing system configuration 410 may include a processor resource that includes a central processing unit (CPU) with 4 cores, each core having a processing speed of 3000 megahertz (MHz). In addition, the computing system may include a memory resource that includes 64 gigabytes (GB) of memory, a storage resource capable of handling 200 MB/sec of disk input/output (I/O), and a network resource capable of handling 700 Mbits/sec of network traffic throughput.

Minimum utilization levels 420 may represent minimum utilization levels that have been identified while monitoring the above-mentioned computing system configured according to computing system configuration 410. In one example, the minimum utilization levels contained in minimum utilization levels 420 may represent minimum utilization levels identified by utilization-level identification module 108 as part of step 306 in FIG. 3. In this example, minimum utilization levels 420 may include a minimum utilization level for each processor core of the computing system. As shown in minimum utilization levels 420, the minimum utilization levels associated with core 1, core 2, core 3, and core 4 are 24%, 23%, 17%, and 19%, respectively. Additionally, minimum utilization levels 420 may include a minimum utilization level of 45% for the memory resource of the computing system. Minimum utilization levels 420 may also include a minimum utilization level of 80 MB/sec for the storage resource of the computing system and a minimum utilization level of 300 Mbits/sec for the network resource of the computing system.

Resource requirements 430 may represent the resources required to validate a backup of the above-mentioned computing system configured according to computing system configuration 410. In this example, the resources required to validate the backup were determined based at least in part on the minimum utilization levels identified in minimum utilization levels 420 and based on an additional 100 MHz of processor resource, 200 MB of memory resource, and 5 Mbits/sec of network speed required to run a validation script during the validation of the backup of the computing system. As shown, resource requirements 430 may include a processing resource requirement of 2590 MHz, a memory resource requirement of 29 GB, a disk I/O requirement of 80 MB/sec, and a network speed requirement of 305 Mbits/sec.

In this example, the resource requirement includes the minimum utilization levels associated with core 1, core 2, core 3, and core 4 from minimum utilization levels 420 and the additional 100 MHz of processor resource required by the validation script (e.g., 24% of 3000 MHz+23% of 3000 MHz+17% of 3000 MHz+19% of 3000 MHz+100 MHz=2590 MHz). The memory resource requirement includes the minimum utilization level of the memory resource from minimum utilization levels 420 and the additional 200 MB of memory resource required by the validation script (e.g., 45% of 64 GB+200 MB=29 GB). The disk I/O requirement of 80 MB/sec represents the minimum utilization level of disk I/O from minimum utilization levels 420. The network speed requirement represents the minimum utilization level of network speed from minimum utilization levels 420 in addition to the additional amount of network speed required by the validation script (e.g., 300 Mbits/sec+5 Mbits/sec=305 Mbits/sec).

Validation system configuration 440 illustrates how resources of a validation system may be allocated based on resource requirements 430. For example, validation system configuration 440 may represent the way in which resources of the validation system have been allocated by configuration module 112 as part of step 310 in FIG. 3. As shown, validation system configuration 440 may include information indicating a processor-resource configuration, a memory-resource configuration, a storage-resource configuration, and a network-resource configuration. A validation system that has been configured based on validation system configuration 440 would have a processor resource that includes 2 virtual CPUs, each virtual CPU having a processing speed of 1800 MHz. In additional, the validation system would have a memory resource that includes 32 GB of memory, a storage resource capable of handling 80 MB/sec of disk I/O, and a network resource capable of handling 305 Mbits/sec of network traffic throughput. In this example, the amount of each resource equals or exceeds the amount required to validate the backup of the computing system.

The examples and descriptions provided in connection with FIG. 4 illustrate how the systems and methods disclosed herein may reduce backup-validation resource consumption by managing system resources allocated for backup validation based on system resource utilization levels. For example, if a validation system configured according to validation system configuration 440 (instead of computing system configuration 410) is used to validate a backup of a computing system configured according to computing system configuration 410, processor resource consumption, memory resource consumption, storage resource consumption, and network resource consumption may be reduced by 70, 50, 60, and 56 percent, respectively.

Figure 5:
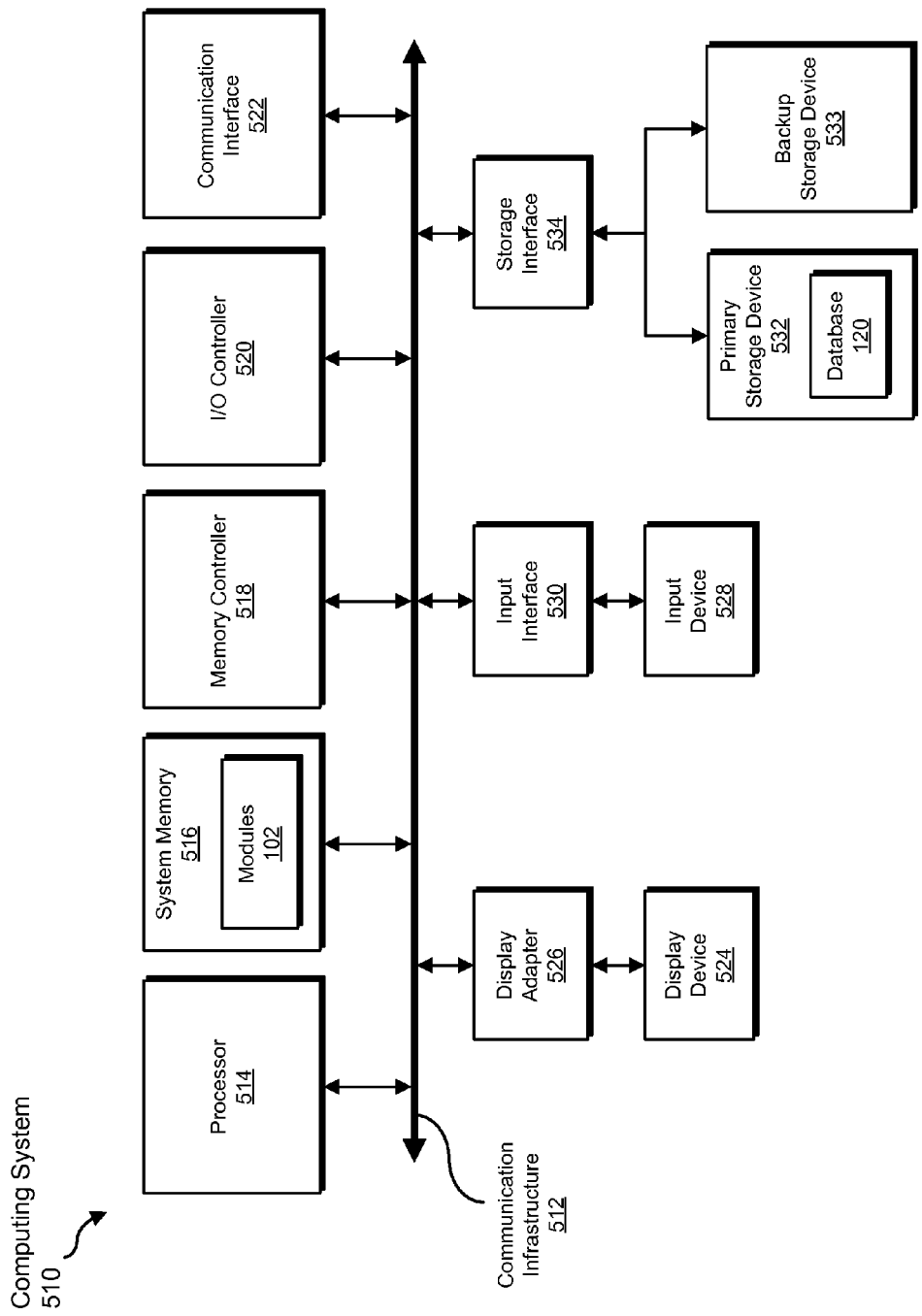
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, monitoring, determining, validating, running, configuring, using, storing, and managing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, virtual machines, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
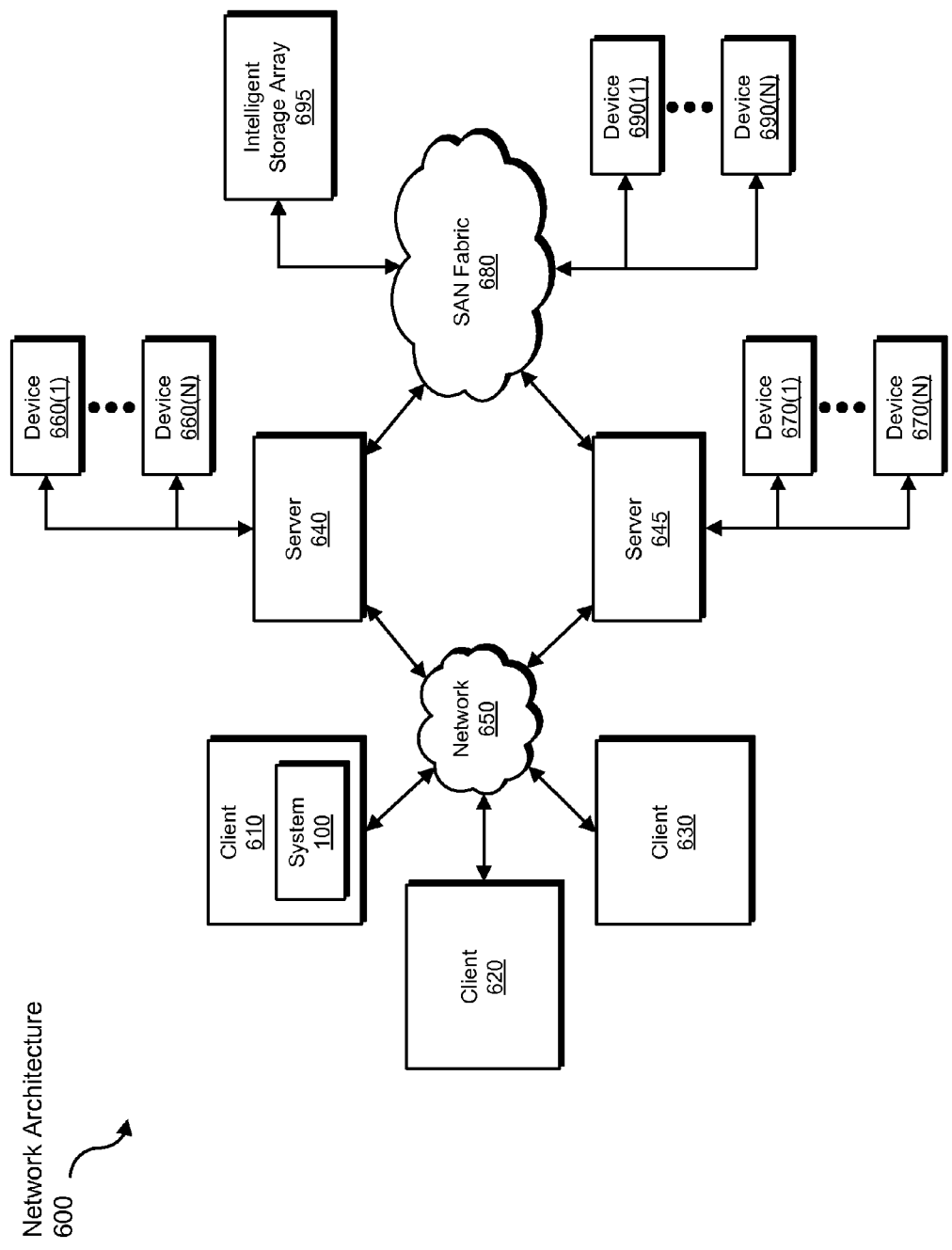
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, monitoring, determining, validating, running, configuring, using, storing, and managing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing system resources allocated for backup validation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a validation system and/or a backup system into an efficient and reliable system for validating system backups.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing system resources allocated for backup validation, at least a portion of the method being performed by a computing device comprising at least one processor, the method comprising:

identifying a computing system that is to be backed up, wherein at least one application runs within the computing system;

monitoring at least one resource of the computing system in order to determine to what extent the resource is utilized while the application runs within the computing system;

based on the monitoring of the resource of the computing system, identifying a minimum utilization level of the resource detected during at least one of:
- a predetermined period of time before a backup of the computing system is created;
- a predetermined period of time during which the backup of the computing system is created;
- a predetermined period of time after the backup of the computing system is created;

determining an amount of the resource required to validate the backup of the computing system by:
- identifying a validation procedure that will be used to validate the backup of the computing system;
- identifying a predetermined amount of the resource that is required, in addition to the minimum utilization level of the resource, to perform the validation procedure;
- determining that the amount of the resource required to validate the backup of the computing system is equal to the sum of the minimum utilization level of the resource and the predetermined amount of the resource required to perform the validation procedure, wherein validating the backup of the computing system comprises running the application;

configuring a validation system to validate the backup of the computing system, wherein resources of the validation system are allocated based at least in part on the amount of the resource required to validate the backup of the computing system;

upon configuring the validation system, using the validation system and the validation procedure to validate the backup of the computing system in order to reduce backup-validation resource consumption.

2. The computer-implemented method of claim 1, further comprising storing, with the backup of the computing system, at least one of:
- the minimum utilization level of the resource;
- the amount of the resource required to validate the backup of the computing system.

3. The computer-implemented method of claim 1, wherein the minimum utilization level of the resource is detected during the predetermined period of time before the backup of the computing system is created.

4. The computer-implemented method of claim 1, wherein the minimum utilization level of the resource is detected during the predetermined period of time during which the backup of the computing system is created.

5. The computer-implemented method of claim 1, wherein the validation procedure comprises at least one of:
- running the application within the validation system in order to determine whether the backup of the computing system is restorable;
- running at least one validation script within the validation system, wherein the validation script is used to validate the backup of the computing system.

6. The computer-implemented method of claim 5, wherein the predetermined amount of the resource that is required, in addition to the minimum utilization level of the resource, to perform the validation procedure comprises an amount of the resource required to run the validation script within the validation system.

7. The computer-implemented method of claim 1, wherein:
the computing system comprises a virtual machine;
the monitoring of the resource of the computing system is performed at least in part using a hypervisor application programming interface, the hypervisor application programming interface providing access to resource utilization information of the virtual machine.

8. The computer-implemented method of claim 1, wherein the monitoring of the resource of the computing system is performed at least in part by a monitoring agent application running within the computing system.

9. The computer-implemented method of claim 1, wherein the predetermined amount of the resource that is required, in addition to the minimum utilization level of the resource, to perform the validation procedure is equal to zero.

10. The computer-implemented method of claim 1, wherein the minimum utilization level of the resource is detected during the predetermined period of time after the backup of the computing system is created.

11. A system for managing system resources allocated for backup validation, the system comprising:
an identification module programmed to identify a computing system that is to be backed up, wherein at least one application runs within the computing system;

a resource-monitoring module programmed to monitor at least one resource of the computing system in order to determine to what extent the resource is utilized while the application runs within the computing system;

a utilization-level identification module programmed to, based on the monitoring of the resource of the computing system, identify a minimum utilization level of the resource detected during at least one of:
- a predetermined period of time before a backup of the computing system is created;
- a predetermined period of time during which the backup of the computing system is created;
- a predetermined period of time after the backup of the computing system is created;

a required-resource determination module programmed to determine an amount of the resource required to validate the backup of the computing system by:
- identifying a validation procedure that will be used to validate the backup of the computing system;
- identifying a predetermined amount of the resource that is required, in addition to the minimum utilization level of the resource, to perform the validation procedure;
- determining that the amount of the resource required to validate the backup of the computing system is equal to the sum of the minimum utilization level of the resource and the predetermined amount of the resource required to perform the validation procedure, wherein validating the backup of the computing system comprises running the application;

a configuration module programmed to configure a validation system to validate the backup of the computing system, wherein resources of the validation system are allocated based at least in part on the amount of the resource required to validate the backup of the computing system;

a validation module programmed to, upon configuring the validation system, use the validation system and the validation procedure to validate the backup of the computing system in order to reduce backup-validation resource consumption;

at least one processor configured to execute the identification module, the resource-monitoring module, the utilization-level identification module, the required-resource determination module, the configuration module, and the validation module.

12. The system of claim 11, wherein the required-resource determination module is further programmed to store, with the backup of the computing system, at least one of:

the minimum utilization level of the resource;

the amount of the resource required to validate the backup of the computing system.

13. The system of claim 11, wherein the minimum utilization level of the resource is detected during the predetermined period of time before the backup of the computing system is created.

14. The system of claim 11, wherein the minimum utilization level of the resource is detected during the predetermined period of time during which the backup of the computing system is created.

15. The system of claim 11, wherein the validation procedure comprises at least one of:

running the application within the validation system in order to determine whether the backup of the computing system is restorable;

running at least one validation script within the validation system, wherein the validation script is used to validate the backup of the computing system.

16. The system of claim 15, wherein the predetermined amount of the resource that is required, in addition to the minimum utilization level of the resource, to perform the validation procedure comprises an amount of the resource required to run the validation script within the validation system.

17. The system of claim 11, wherein:

the computing system comprises a virtual machine;

the resource-monitoring module is programmed to monitor the resource of the computing system at least in part by using a hypervisor application programming interface, the hypervisor application programming interface providing access to resource utilization information of the virtual machine.

18. The system of claim 11, wherein the resource-monitoring module is programmed to monitor the resource of the computing system at least in part by using a monitoring agent application running within the computing system.

19. The system of claim 11, wherein the predetermined amount of the resource that is required, in addition to the minimum utilization level of the resource, to perform the validation procedure is equal to zero.

20. A non-transitory computer-readable-storage medium comprising one or more computer-executable instructions that, when executed by at least one processor of a computing device, cause the computing device to:

identify a computing system that is to be backed up, wherein at least one application runs within the computing system;

monitor at least one resource of the computing system in order to determine to what extent the resource is utilized while the application runs within the computing system;

based on the monitoring of the resource of the computing system, identify a minimum utilization level of the resource detected during at least one of:

a predetermined period of time before a backup of the computing system is created;

a predetermined period of time during which the backup of the computing system is created;

a predetermined period of time after the backup of the computing system is created;

determine an amount of the resource required to validate the backup of the computing system by:

identifying a validation procedure that will be used to validate the backup of the computing system;

identifying a predetermined amount of the resource that is required, in addition to the minimum utilization level of the resource, to perform the validation procedure;

determining that the amount of the resource required to validate the backup of the computing system is equal to the sum of the minimum utilization level of the resource and the predetermined amount of the resource required to perform the validation procedure, wherein validating the backup of the computing system comprises running the application;

configure a validation system to validate the backup of the computing system, wherein resources of the validation system are allocated based at least in part on the amount of the resource required to validate the backup of the computing system;

upon configuring the validation system, use the validation system and the validation procedure to validate the backup of the computing system in order to reduce backup-validation resource consumption.

* * * * *